US007890213B2

(12) United States Patent
Greco et al.

(10) Patent No.: US 7,890,213 B2
(45) Date of Patent: Feb. 15, 2011

(54) DEVICE AND METHOD FOR MIXING A FLUID PRODUCT CONTAINED IN A CLOSED CONTAINER

(75) Inventors: Guido Greco, San Felice Sul Panaro (IT); Fabrizio Benatti, Cavezzo (IT)

(73) Assignee: CPS Color Equipment Spa Con Unico Socio, San Felice Sul Panaro (MO) (IT)

( * ) Notice: Subject to any disclaimer, the term of this patent is extended or adjusted under 35 U.S.C. 154(b) by 474 days.

(21) Appl. No.: 11/570,884

(22) PCT Filed: Apr. 5, 2005

(86) PCT No.: PCT/IB2005/000880

§ 371 (c)(1), (2), (4) Date: Dec. 19, 2006

(87) PCT Pub. No.: WO2006/008590

PCT Pub. Date: Jan. 26, 2006

(65) Prior Publication Data

US 2008/0269950 A1 Oct. 30, 2008

(30) Foreign Application Priority Data

Jun. 30, 2004 (IT) .......................... UD2004A0137

(51) Int. Cl.

| | |
|---|---|
| ***G05B 21/00*** | (2006.01) |
| ***G06F 19/00*** | (2006.01) |
| ***G06F 7/00*** | (2006.01) |
| ***G06F 17/00*** | (2006.01) |
| ***G05D 7/00*** | (2006.01) |

(52) U.S. Cl. ......................... 700/265; 700/97; 700/117; 700/230; 700/239; 700/285

(58) Field of Classification Search .................. 700/97, 700/117, 230, 239, 265, 285
See application file for complete search history.

(56) References Cited

U.S. PATENT DOCUMENTS 4,046,287 A * 9/1977 Hoekstra et al. .............. 222/16

(Continued)

FOREIGN PATENT DOCUMENTS

CN 1482943 3/2004

(Continued)

OTHER PUBLICATIONS

PCT Search Report dated Sep. 9, 2005 of Patent Application No. PCT/IB2005/000880 filed Apr. 5, 2005.

*Primary Examiner*—Albert Decady
*Assistant Examiner*—Jennifer L Norton
(74) *Attorney, Agent, or Firm*—Vern Maine & Associates

(57) ABSTRACT

A mixing machine for mixing a fluid product contained in a container, comprising one or more mixing devices, each able to mix the product according to a determinate mixing cycle chosen from a plurality of elementary mixing cycles. A command and control unit has a first memory in which the operating sequences of the plurality of elementary mixing cycles are memorized, and is connected to a data introduction device associated with a second memory in which the characteristics of the container or of the product to be mixed are memorized. Each operating sequence of the determinate mixing cycle is pre-defined according to the characteristics memorized in the second memory.

3 Claims, 6 Drawing Sheets

U.S. PATENT DOCUMENTS

| | | | | |
|---|---|---|---|---|
| 5,083,591 | A * | 1/1992 | Edwards et al. | 141/9 |
| 5,137,367 | A * | 8/1992 | Madonia et al. | 366/218 |
| 5,153,825 | A * | 10/1992 | Yauk et al. | 705/1.1 |
| 5,203,387 | A * | 4/1993 | Howlett et al. | 141/103 |
| 5,245,548 | A * | 9/1993 | Kuan | 700/240 |
| 5,268,620 | A | 12/1993 | Hellenberg | |
| 6,234,218 | B1 * | 5/2001 | Boers | 141/83 |
| 6,554,467 | B2 | 4/2003 | Snyder et al. | |
| 6,745,103 | B1 * | 6/2004 | McKillop et al. | 700/230 |
| 6,801,813 | B2 * | 10/2004 | Kay et al. | 700/86 |
| 6,834,370 | B1 * | 12/2004 | Brandl et al. | 715/201 |
| 7,020,876 | B1 * | 3/2006 | Deitz et al. | 718/100 |
| 7,457,685 | B2 * | 11/2008 | D'Silva | 700/239 |
| 7,572,638 | B2 * | 8/2009 | Pressman et al. | 436/47 |
| 7,717,614 | B2 * | 5/2010 | Miller | 366/209 |
| 2002/0048213 | A1 | 4/2002 | Wilmer et al. | |
| 2003/0214878 | A1 | 11/2003 | Huckby | |
| 2004/0008573 | A1 | 1/2004 | MacDonald et al. | |
| 2004/0013031 | A1 | 1/2004 | Salas et al. | |
| 2005/0038557 | A1 * | 2/2005 | Friel et al. | 700/233 |
| 2007/0211568 | A1 * | 9/2007 | Lowan et al. | 366/209 |
| 2008/0066019 | A1 * | 3/2008 | Worek et al. | 715/965 |
| 2009/0099695 | A1 * | 4/2009 | Trevino et al. | 700/265 |
| 2009/0105875 | A1 * | 4/2009 | Wiles | 700/239 |
| 2009/0228143 | A1 * | 9/2009 | Hughes et al. | 700/239 |
| 2009/0248199 | A1 * | 10/2009 | Milhorn | 700/239 |

FOREIGN PATENT DOCUMENTS

| | | | |
|---|---|---|---|
| DE | 3111437 | A1 | 10/1982 |
| DE | 9320352 | U | 6/1994 |
| EP | 0796652 | A1 | 9/1997 |
| EP | 1360987 | A2 | 11/2003 |
| WO | WO 9414106 | A1 * | 6/1994 |
| WO | 03/028873 | A2 | 4/2003 |

* cited by examiner

DEVICE AND METHOD FOR MIXING A FLUID PRODUCT CONTAINED IN A CLOSED CONTAINER

RELATED APPLICATIONS

This application is a US National Phase of PCT Application No. PCT/IB2005/000880, filed Apr. 5, 2005, which claims priority to Italian Application No. UD2004A000137, filed Jun. 30, 2004. Each of these applications is herein incorporated in its entirety by reference.

FIELD OF THE INVENTION

The present invention concerns a mixing machine and a relative method for mixing a fluid product contained in a closed container so as to render the product homogeneous. To be more exact, the fluid product is for example a coloring liquid, a base for paint, a paint, or other fluid coloring substance.

BACKGROUND OF THE INVENTION

Mixing machines are known, comprising one or more mixing devices and able to mix a fluid product, such as for example a paint, contained in a closed container.

Each known mixing device comprises movement mechanisms, having at least an electric motor able to impart to the container, and hence to the product contained therein, a series of mixing movements. According to the different types of mixing movements, there are different types of mixing devices: vibrational, gyroscopic, rotational-vibrational, orbital.

Known mixing devices also comprise a clamping or containing mechanism able to temporarily clamp the container to the movement mechanisms, by means of a suitable clamping pressure.

Each fluid product has its own characteristics, variable for example according to its specific weight and its volume, its fluid-dynamic and rheological characteristics and its state of preservation.

Moreover, each container has variable characteristics connected to its geometric shape, its dimensions, the material of which it is made, and also its state of preservation.

The homogeneity and effectiveness of the mixing of a fluid product therefore depend on a multiplicity of characteristics, like those of the product itself, its container, and the type of mixing device.

Some known mixing devices allow the user to chose some parameters, such as for example the speed of rotation of the motor, the duration of the rotation, and the possible clamping pressure.

According to the state of the art, in order to mix a determinate fluid product, the user or operator first chooses the mixing machine from those available at the site where he is, for example in a sales outlet; subsequently, according to the type of mixing machine chosen, he sets the parameters manually, which the machine allows him to vary, and thus defines a determinate mixing cycle.

Therefore, known machines have the disadvantage that a determinate mixing cycle is chosen at the discretion of the user, that is to say, empirically and hence subject to errors.

Consequently known mixing machines do not allow an effective and pre-defined correlation between the characteristics of the product to be mixed and the mixing cycle to be carried out.

In the state of the art, the metering process and the mixing process are separate both in space and in time, and take place in two or more different machines, often made by different producers, arranged more or less close to each other and operating sequentially, one after the other. The only integrating element between the two processes consists of the human intervention, through manual interventions and empirical decisions made by the operator, sometimes with little specialization and often under urgent sales conditions. In present sale points there is no form of physical-functional integration of dispensers and mixing machines. Only in the large, paint-producing plants, that is, in the factories, are there automatic systems to move the drums or containers, which manage the movement of the latter between dispensers and mixing machines.

This entails the following disadvantages.

The repeatability of the same paint is today entrusted mainly, or almost exclusively, to the metering process. The very high requisites of precision, accuracy, repeatability that can be obtained in the metering process, that is, upstream, through sophisticated and high cost technologies, can be cancelled or penalized by inappropriate mixing processes, decided empirically or subjectively, downstream.

The intelligence available overall in processing machines on the whole, that is, for metering and mixing, present in the sale points, aboard the dispenser and/or the mixing machine in the form of a PC and electronic command and control units, is often under-used, since it is exclusively used to automatically actuate cycles that are set manually, leaving the operator to decide, according to a limited field of combinations and variants, the fundamental parameters for the successful outcome of the mixing, such as: the duration of the cycle, by means of a timer and, where present, the speed of mixing, by means of a push-button panel.

Until now it has been impossible to manage the basic information of the whole process to prepare the paint in a systematic, integrated and "scientific" manner and, for example, to choose the most suitable mixing machine, from all those available, for that type of product to be mixed and the most suitable cycle for that type of product.

Furthermore, until now, no feedback information was available on the state of progress of the process under way, of the production program of the dispensing or mixing machines and on the state of preservation of the machines themselves, and of their components. The process to prepare the paint therefore took place "in an open ring".

One purpose of the present invention is to achieve a mixing machine and perfect a relative method that are able to perform mixing cycles according to the characteristics of the product, of the container and/or of the mixing device, in a selective and substantially automatic manner.

Another purpose of the present invention is to ensure a uniform effectiveness in the various mixing cycles.

Another purpose of the present invention is to achieve a control apparatus in a "closed ring", for example by means of a "real time on-line" connection which:

- operates bi-directionally between one or more dispenser units and one or more mixing units;
- is able to make the chosen mixing unit perform the optimum mixing cycle of those possible;
- identifies this cycle according to objective information available upstream;
- controls and monitors the performance of the mixing cycle during which it acquires information useful for monitoring the state of preservation of the mixing machine and its components and other information useful for servicing and marketing needs, to be communicated upstream.

Another purpose of the present invention is to make possible a bi-directional and bi-univocal transfer of information concerning the process, the state, the life of the dispensing and/or mixing machines, from one or more units or modules, which can be, in relation to the necessary operating configurations, integrated in the same machine, present in different but nearby units or remote units, connected in a network, such as for example internet, intranet, extranet or others.

Another purpose of the present invention is to achieve a communication network that allows a central memory, present in a server, a computer or other, wherever it is located, to manage de-localized memories, allowing them to choose between the dispensing machines and/or mixing machines available there, the most appropriate ones to obtain the expected result and make them operate in the most convenient manner and/or to receive from said machines information useful to recognize the state of functioning or preservation of the machine, and to take the consequent measures to improve it.

The Applicant has devised, tested and embodied this invention to overcome the shortcomings of the state of the art and to obtain these and other purposes and advantages.

SUMMARY OF THE INVENTION

The present invention is set forth and characterized in claims.

In accordance with the above purposes, a mixing machine according to the present invention for mixing a fluid product contained in a closed container comprises one or more mixing devices, each one able to mix the product according to a determinate mixing cycle, defined as the combination of a plurality of elementary mixing cycles, and a command and control unit associated with data introduction means and able to control and selectively drive the mixing devices according to the data arriving from the data introduction means.

According to a characteristic of the present invention, the command and control unit comprises a first memory in which the operating sequences of the plurality of elementary mixing cycles are memorized. Moreover, the data introduction means are associated with a second memory in which at least the characteristics of the container and/or of the products to be mixed are able to be memorized.

According to the invention each operating sequence of the determinate elementary mixing cycle is pre-defined according to the above characteristics.

In this way, the type of mixing is closely correlated to the characteristics of the base product and the dyes dispensed, of the container and of the mixing devices. In fact, it will be the programmed command and control unit, and not the user as happens in known mixing machines, that will select and define a determinate mixing cycle according to the specific container and product to be mixed. At most, the user will contribute in inserting the data relating to the container and the product to be mixed.

According to a form of embodiment, each mixing device comprises clamping or containing means able to temporarily clamp the container, movement means able to move the container in order to mix the product, and possibly repositioning means able to position the container in a determinate initial position at the end of the determinate mixing cycle.

According to the invention, each mixing device also comprises command means able to selectively drive the movement means, the clamping means and the possible repositioning means.

Moreover, each mixing device comprises detection means able to detect parameters, such as the position or the speed of the movement means, of the clamping means and of the possible repositioning means, generating corresponding electric signals.

According to the invention, the command and control unit comprises at least a microprocessor connected to the detection means and the command means in order to command the latter according to the electric signals generated by the detection means and the characteristics of the specific container and product to be mixed.

According to the present invention, the mixing machine is able to operate according to a mixing method, which provides a control step during which, by means of the command and control unit, at least a mixing device is driven and controlled so as to achieve a determinate mixing cycle chosen as the combination of a plurality of elementary mixing cycles.

The method according to the present invention also comprises, before the control step, a definition step, during which at least the characteristics of the specific container and the specific product to be mixed are defined manually and automatically, and a processing step, during which the command and control unit selects and actuates said determinate mixing cycle according to the characteristics defined in the definition step.

In accordance with another characteristic of the present invention, said mixing machine is inserted in an apparatus that also comprises one or more dispensing units, each one able to dispense said fluid product, and electronic processing means, associated with said mixing machine and with said dispensing unit, in order to command said mixing machine so that it performs a determinate mixing cycle from a plurality of mixing cycles programmed and memorized in an electronic memory.

The connection between said electronic processing means, said mixing machine and said dispensing unit can be achieved by any known means, such as for example serially, or by USB, or by communication bus, and other communication means.

The data of each operating step of the mixing machine and the dispensing unit can be acquired in instrumental and/or algorithmic form, through hardware and/or software means to identify and formulate the color of a known type, for example sensors, spectrophotometers, optical readers and other.

It is thus possible to obtain at least the following advantages:

- to make it possible and certain to choose the optimum mixing cycle, from among all those made possible in the unit selected by the actuator means present;
- to send the necessary data automatically to said unit, thus improving the final result of the process to prepare the paint, without penalizing downstream the high precision/ repeatability generated upstream, with the use of very expensive and sophisticated technologies, releasing the operator from subjective choices and tedious operations;
- to acquire from the mixing machine, through sensor means, a series of data concerning functioning, reliability and life, state of preservation, operating modalities and purposes, work load and productivity, and other data, suitable to achieve a "control of the mixing machine in a closed ring", to monitor its state with remote analysis/diagnosis, to perform interventions of ordinary/preventative and extraordinary maintenance, and every other service or exchange of information suitable to improve the management of the sales point and its integration into the information/distribution network of the organization;
- to improve the management of the more complex sales points equipped with several mixing machines, through s system of communication (inside the sales point between mixing machines, between sales points, between sales point and head office) which allows the optimum management choices of the availability of the machines, activating and actuating said units, providing them with the necessary information, the relative production plans;

to enable the central memory of the electronic processing means to acquire peripheral data, concerning the functioning, process, quality/reliability of the critical components of the mixer, allowing, through an adequate processing and analysis of the data received, the remote diagnosis of the state of the machine and establishing adequate and prompt interventions of calibration, maintenance and/or repair;

to create in the sales point the technological pre-requisites (intelligence and memory) necessary for acquiring and processing data on the functioning, state of preservation, modalities and purposes of use, productivity, type of products treated, and other, transforming the mixing machine from a simple element that performs a process into a source of information (business sensor), and therefore able to feed upstream, with its data, an integrated system of logistical-productive (suppliers, stores, productions and other) and commercial management (management of orders, marketing and promotions) between the various sales points and the mother organization upstream, through applying methods typical of e-commerce, e-procurement, e-business and/or with the intention of achieving the model of extended enterprise.

BRIEF DESCRIPTION OF THE DRAWINGS

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

These and other characteristics of the present invention will become apparent from the following description of a form of embodiment, given as a non-restrictive example with reference to the attached drawings wherein.

DETAILED DESCRIPTION

Figure 1:
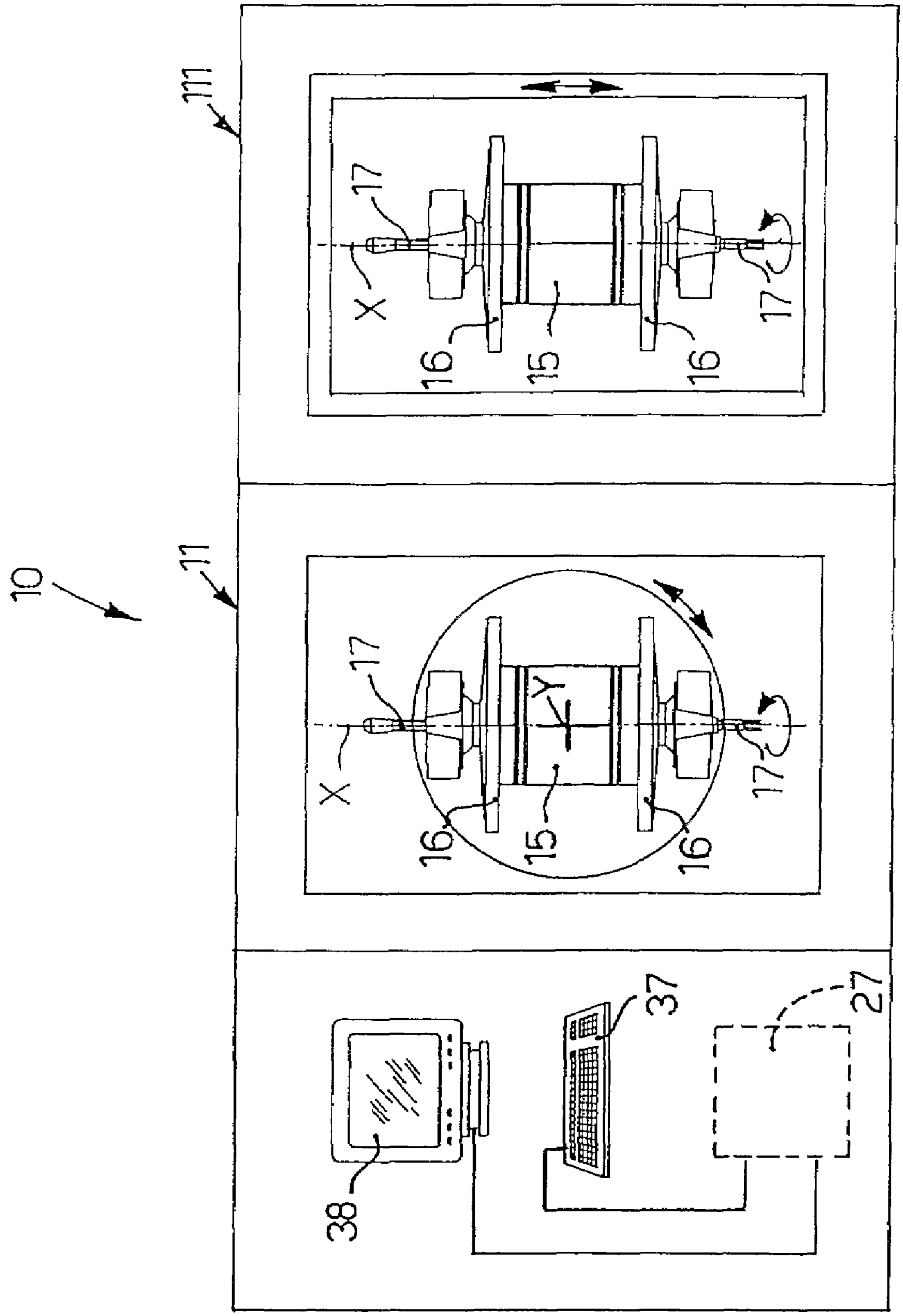
FIG. 1 is a schematic view of a mixing machine according to the present invention, provided with two different mixing devices.

With reference to FIG. 1, a mixing machine 10 according to the present invention comprises one or more mixing devices 11, 111, in this case two, each able to mix a fluid product contained in a container 15.

The container 15 can be either metal or plastic and can have either a cylindrical shape or any other shape, such as for example parallelepiped.

In this case, the fluid product to be mixed is a painting solution consisting of a base component, which can be transparent or white, to which a dye is added, substantially consisting of pigments.

In this case, the mixing device 11 is of the gyroscopic type, that is, able to impart to the container 15 a main rotation with respect to a horizontal axis Y and a secondary rotation with respect to a vertical axis X, perpendicular to the axis Y and which normally coincides with the longitudinal axis of the container 15.

The mixing device 111 on the other hand is of the rotational-vibrational type, that is, able to impart to the container 15 a movement of the rotational-translatory type, by means of a rotation with respect to the vertical axis X and an oscillatory movement with respect to said axis X. In a simplified version, not shown in the drawings, the mixing device 111 can be of the vibrational type, that is, only an oscillatory movement with respect to the axis X is imparted to the container 15.

The mixing machine 10 can also comprise other types of mixing devices, not shown in the drawings and able, for example, to impart to the container 15 a movement of the orbital type, that is, a rotational movement with respect to an axis of rotation inclined by a certain angle of between 0° and 90° with respect to the vertical axis X.

The mixing devices 11 and 111 can be of any known type and each one comprises two clamping elements 16 moved reciprocally, one towards the other, or one away from the other, by a clamping mechanism 17, so as to selectively clamp the container 15 with a determinate clamping force. The clamping mechanism 17 comprises a command electric motor 18 and a clamping sensor 19, not represented in the drawings and schematized in FIG. 2.

According to a variant, not shown in the drawings, instead of the clamping elements 16 each mixing device 11, 111 can be provided with a containing device, for example a basket, able to contain and clamp the container 15.

Figure 2:
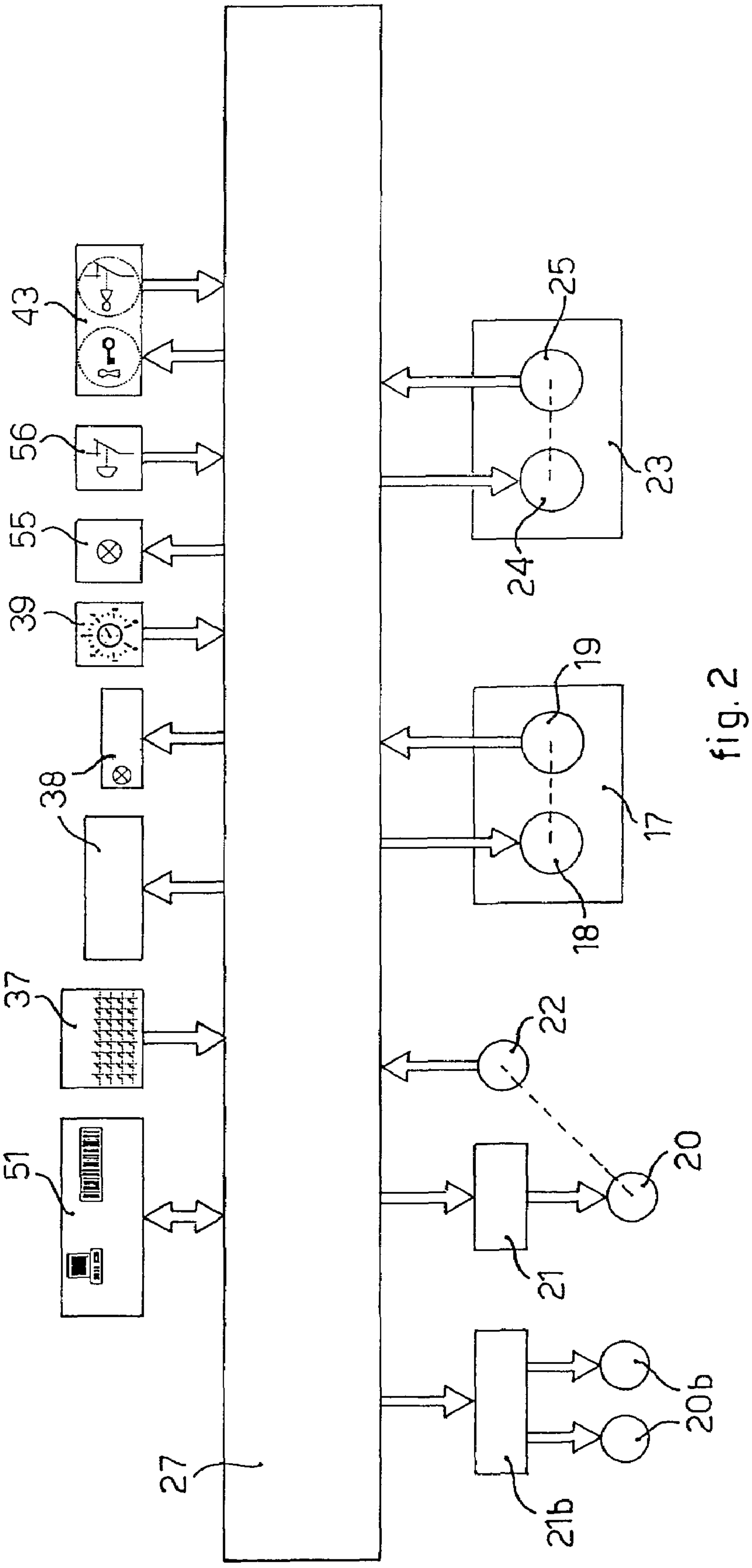
FIG. 2 is a block diagram of some components of the machine in FIG. 1.

Each mixing device 11, 111 also comprises a main electric motor 20 schematized in FIG. 2, which is able to impart to the container 15 the movements necessary to mix the base component with the dye, so as to obtain a homogeneous fluid product. The electric motor 20 is driven by means of a main drive circuit 21 and is associated with an angular transducer 22 able to detect the position and/or speed thereof.

Each mixing device 11, 111 can also comprise a secondary electric motor or an actuator **20*b*, schematized in FIG. 2, which by means of a secondary drive circuit 21*b*, is able to modify some of the geometric and/or operating parameters of each mixing device 11, 111. These parameters are, for example, the speed of secondary rotation with respect to the principal rotation in the mixing device 11, of the gyroscopic type, and the amplitude of the oscillation in the mixing device 111**, of the vibrational or rotational-vibrational type.

The mixing device 11 can also comprise, optionally, a repositioning mechanism 23 too, of a known type and schematized in FIG. 2, which is able to take the container 15 to the same initial angular position at the end of the mixing cycle. The repositioning mechanism 23 comprises an electric actuator 24 and an associated repositioning sensor 25.

Figure 3:
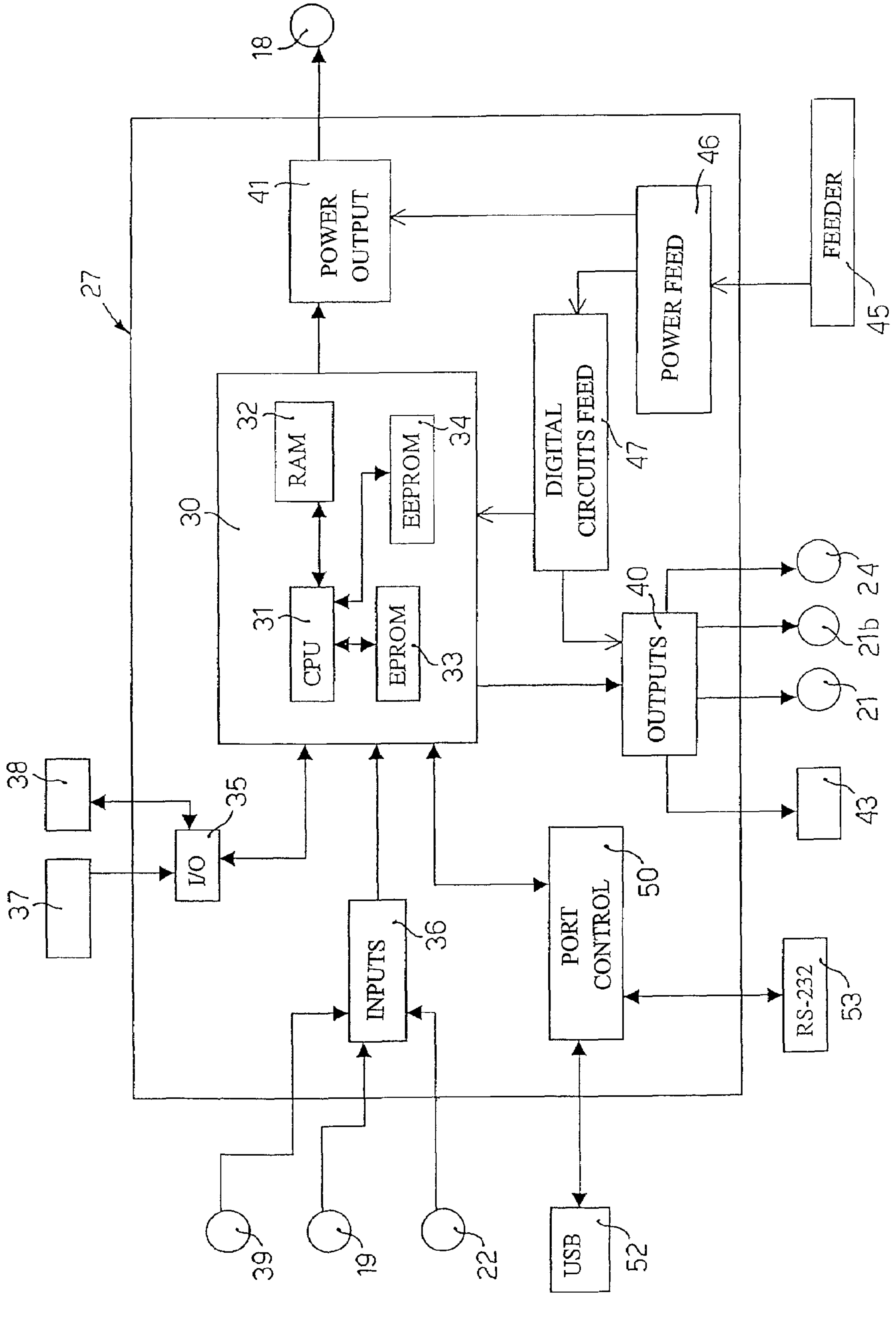
FIG. 3 is a block diagram of the command and control unit of the machine in FIG. 1.

The mixing machine 10 also comprises a command and control unit 27 (FIGS. 2 and 3), of the electronic type, which is able to command and selectively control the mixing devices 11 and 111.

The command and control unit 27 comprises a processing unit 30 (FIG. 3), having a microprocessor, or CPU 31, a random access memory (RAM) 32, an erasable, programmable, read-only memory (EPROM) 33, and an electrically erasable, programmable, read-only memory (EEPROM) 34, connected to the CPU 31.

The EEPROM 34 memorizes both the operating sequences able to achieve the respective elementary mixing cycles of the mixing devices 11, 111, and also the definable characteristics of the different products to be mixed, of the different types of containers 15 and the different mixing devices 11, 111 to be controlled.

The RAM 32 selectively memorizes the characteristics of the specific product to be mixed, and of the specific container in which the latter is contained, while the EPROM 33 memorizes the functioning and management program (firmware) of the processing unit 30, usable in that specific case.

The processing unit 30 is connected to an input and output device 35 and to an input device 36. The first device 35 is connected to a selection device 37, consisting for example of a keyboard, a push-button panel, a console, or a touch screen, and to a display device 38, consisting for example of a video screen, or light-emitting diodes (LEDs).

The input device 36 is connected to the clamping sensor 19, to the angular transducer 22 associated with every main electric motor 20, and possibly to a timer 39, which can be set manually by the user in order to define the duration of determinate operations performed by the mixing machine 10.

The processing unit 30 is also connected to an output device 40 and a power device 41. The output device 40 is connected to the main drive circuit 21 of every main electric motor 20, to the secondary drive circuit 21*b* of every secondary electric motor 20*b*, to the electric actuator 24 of the repositioning mechanism 23, and to a door-block device 43. The latter is able to block a door or shutter, not shown in the drawings, with which every mixing device 11, 111 is normally equipped and which, in the open position, allows the container 15 to be inserted and removed, whereas, in the closed position, it allows to perform the mixing cycles. The power device 41 is connected to the command electric motor 18 of the clamping mechanism 17.

The command and control unit 27 also comprises a power feeder 46 and a feed circuit 47 connected to an external feeder 45.

The command and control unit 27 also comprises a connection device 50, able to connect the processing unit 30 to one or more external electronic devices 51, by means of known connections, such as for example a USB (Universal Serial Protocol) port 52 and a serial port 53, for example of the RS-232 type, or other communication ports. The external electronic devices are, for example, calculators, data reading devices, like bar code readers, or units to dispense fluid products, in turn provided with or controlled by calculators.

The mixing machine 10 can advantageously be connected to electronic processing means, of a known type and not shown in the drawings, which define with said machine and with at least a unit to dispense fluid products, also of a known type, an apparatus or system able to define the optimum mixing parameters, chosen by said processing means from among a series of possible parameters, for example memorized in the data-base relating to the color formulas.

The command and control unit 27 is also connected to a power indicator 55 and an emergency switch 56, able to block the mixing machine 10 in the event of need.

The mixing machine 10 as described heretofore functions as follows.

By means of the selection device 37 the user selects the characteristics relating to the specific fluid product to be mixed and the relative container 15.

The processing unit 30 memorizes the specific characteristics in the RAM 32, and compares them with the characteristics memorized in the EEPROM 34, so as to select the corresponding operating sequence of elementary cycles which makes up a determinate optimum mixing cycle, in order to carry out mixing for those specific characteristics of the product and the relative container 15.

During the determinate elementary mixing cycle, the processing unit 30, according to the input signals arriving from the input device 36, sends corresponding output signals to the output device 40 and the power device 41 in order to drive the main 20 and secondary 20b electric motors, the repositioning mechanisms 23 and the clamping mechanisms 17, according to the operating sequences.

The processing unit 30 commands both the clamping mechanism 17, by means of the command electric motor 18 and according to the data detected by the clamping sensor 19, and also every main electric motor 20, by means of the main drive circuit 21 and according to the data detected by the angular transducers 22, and also every secondary electric motor 20*b*, by means of the secondary drive circuit 21*b*. Moreover, at the end of the mixing cycle, the processing unit 30, receiving the data detected by the repositioning sensor 25, drives the repositioning mechanism 23 by means of the electric actuator 24.

The different types of movement achieved by the drive units and the different clamping forces obtained by means of the clamping elements 16 can advantageously be varied according to the characteristics of the container 15, of the base component and of the dye of the product to be mixed.

Figure 4:
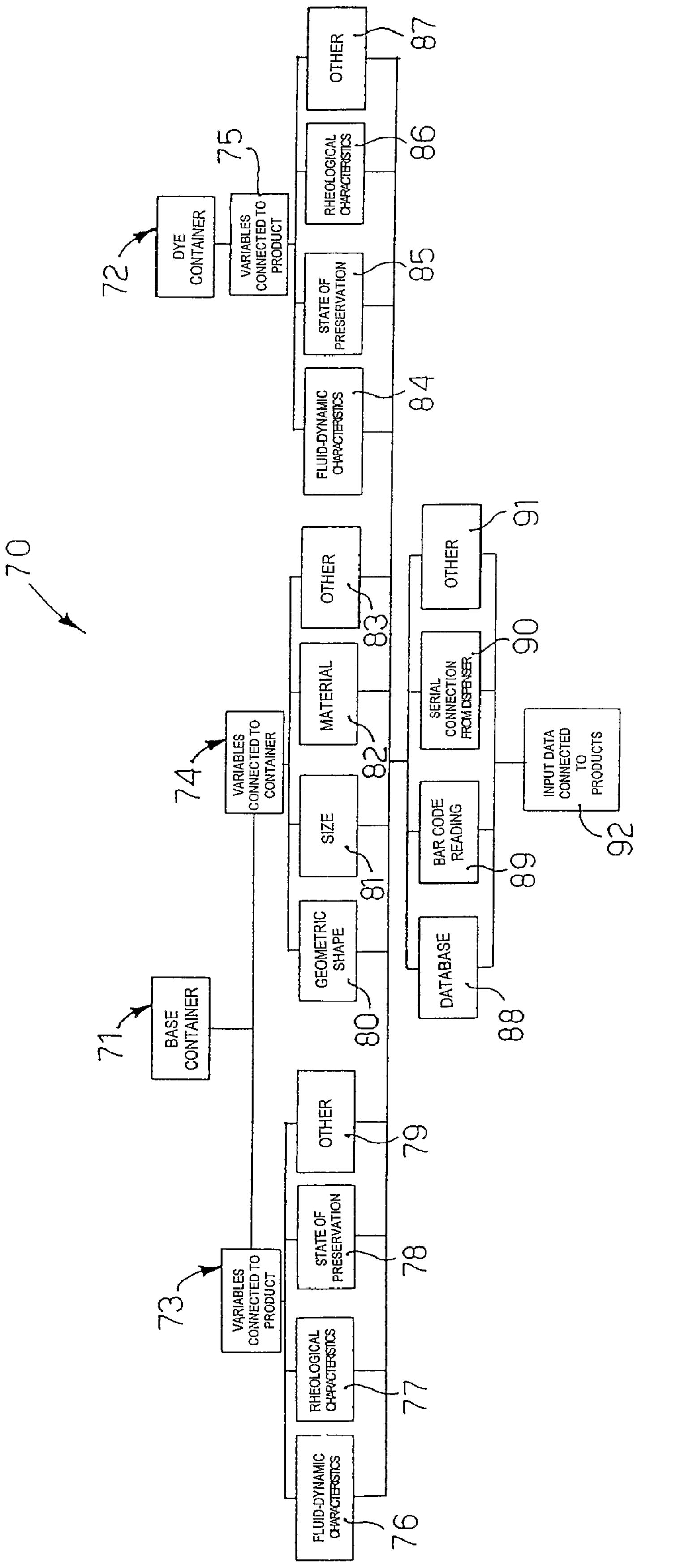
FIG. 4 is a block diagram that shows the acquisition step of the data necessary to define the mixing method of a fluid product, according to the present invention.
Figure 5:
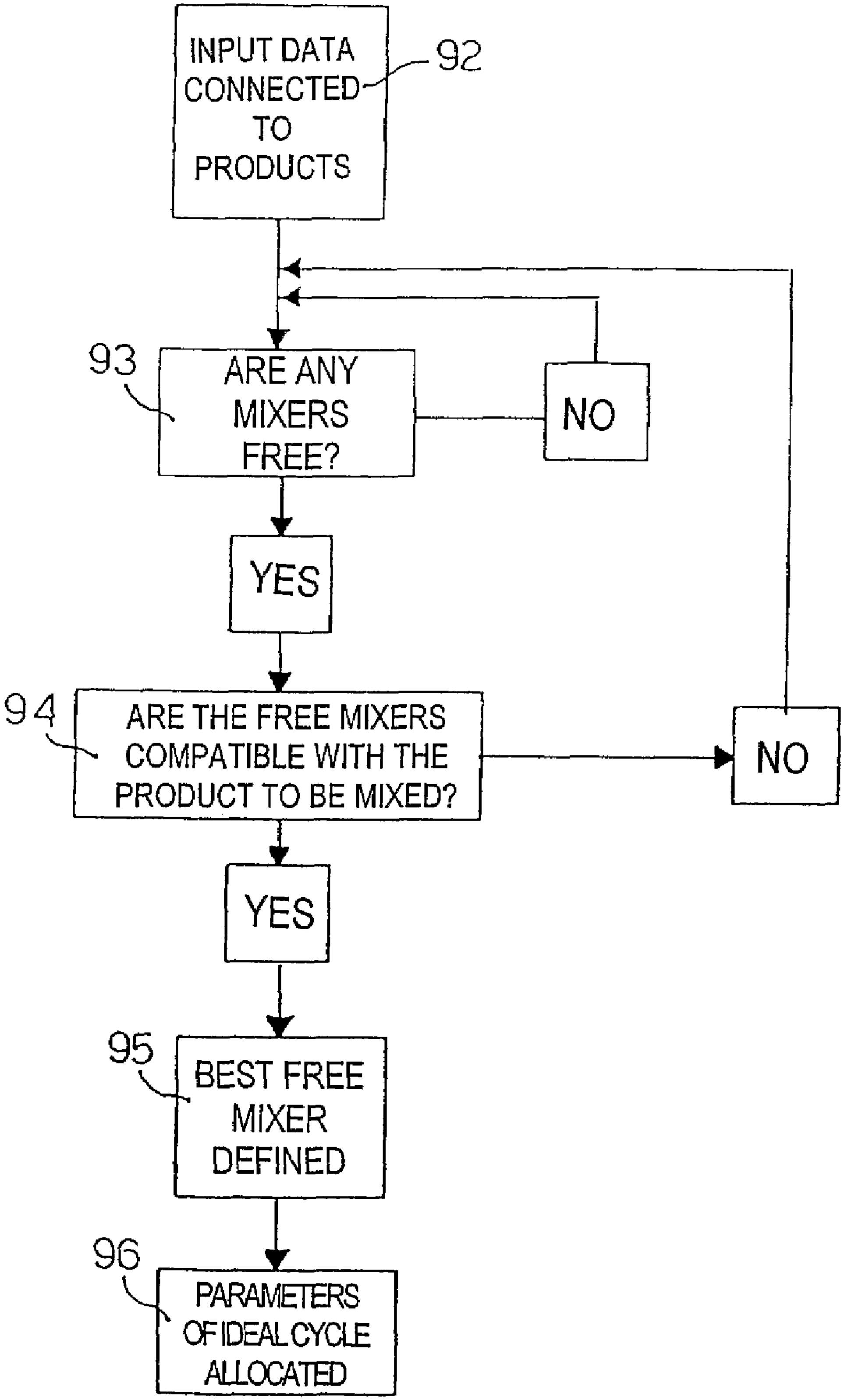
FIG. 5 is a flow chart of the step to process the input data used to choose the mixing device and hence to define the mixing cycle.

With reference to FIGS. 4 and 5, the mixing machine 10 is able to operate according to a method 70, which comprises two microsteps 71 and 72, during which the characteristics, on one hand, of the base component and of the container 15 are respectively defined or acquired, and on the other hand the characteristics of the dye.

To be more exact, the microstep 71 is subdivided into two distinct phases represented by the steps 73 and 74, in which the variables connected to the base component and those connected to the container 15 are respectively defined. The microstep 72 on the contrary comprises a step 75 in which the variables connected to the coloring product are defined.

In their turn, the steps 73 and 74 comprise a series of sub-steps from 76 to 79 and respectively from 80 to 83.

In sub-step 76 the fluid-dynamic characteristics of the base are defined, in sub-step 77 the rheological characteristics, in sub-step 78 the state of preservation and in sub-step 79 other characteristics, such as for example the neutral or white color of the base product.

In sub-step 80 the geometric shape of the container 15 is defined, in sub-step 81 its dimensions, in sub-step 82 the material of which it is made, and in sub-step 83 other characteristics, such as for example its state of preservation.

In sub-step 84 the fluid-dynamic characteristics of the dye are defined, in sub-step 85 the state of preservation, in sub-step 86 the Theological characteristics, and in sub-step 87 other characteristics, such as for example the type of pigment.

All the characteristics defined in the sub-steps from 76 to 87 are memorized in the EEPROM 34 of the command and control unit 27.

According to a variant, the above characteristics are first inserted into the external electronic device 51 and subsequently sent by means of the connection device 50 to the command and control unit 27 and here memorized in the EEPROM 34.

According to another variant, the above characteristics are inserted and memorized in the external electronic device 51 and subsequently sent selectively to the command and control unit 27.

The method 70 also comprises four steps from 88 to 91, during each of which the specific characteristics of a determinate base product, relative container 15 and dye are selected.

During step 88 the above characteristics are selected by means of the selection device 37, during step 89 by means of an optical bar reader (not shown in the drawings), during step 90 by means of the external electronic device 51 and during step 91 by means of a similar device. The processing unit 30 memorizes the selected characteristics in the RAM 32.

In this way, the choice of a particular mixing is not entrusted to the discretion and experience of the user or operator, but is correlated to the characteristics of the base component, the container and the dye to be mixed.

The specific characteristics memorized in the RAM 32 are compared during a step 92 with the characteristics memorized in the EEPROM 34, in order to define an operating sequence of elementary cycles relating to a determinate mixing cycle.

With reference to FIG. 5, after step 92 there follows a verification step 93, during which it is ascertained whether there are mixing devices 11, 111 available, that is, not engaged in another mixing operation.

In the event of a negative outcome, step 93 is cyclically repeated until a positive outcome is obtained, in which case a second verification step 94 occurs, during which it is ascertained whether the mixing device or mixing devices 11, 111 available are suitable to effect the determinate mixing cycle of the specific base product, relative container 15 and dye.

In the event of a negative outcome, after step 94 follows step 93. In the event of a positive outcome, after the second verification step 94 there follows a search step 95, during which a search is performed for the available mixing device 11 or 111 most suitable to effect the above determinate mixing cycle.

After step 95 there follows an allocation step 96, during which the operating sequence defined in step 92 is performed by the CPU 31 so as to achieve the determinate mixing cycle.

Figure 6:
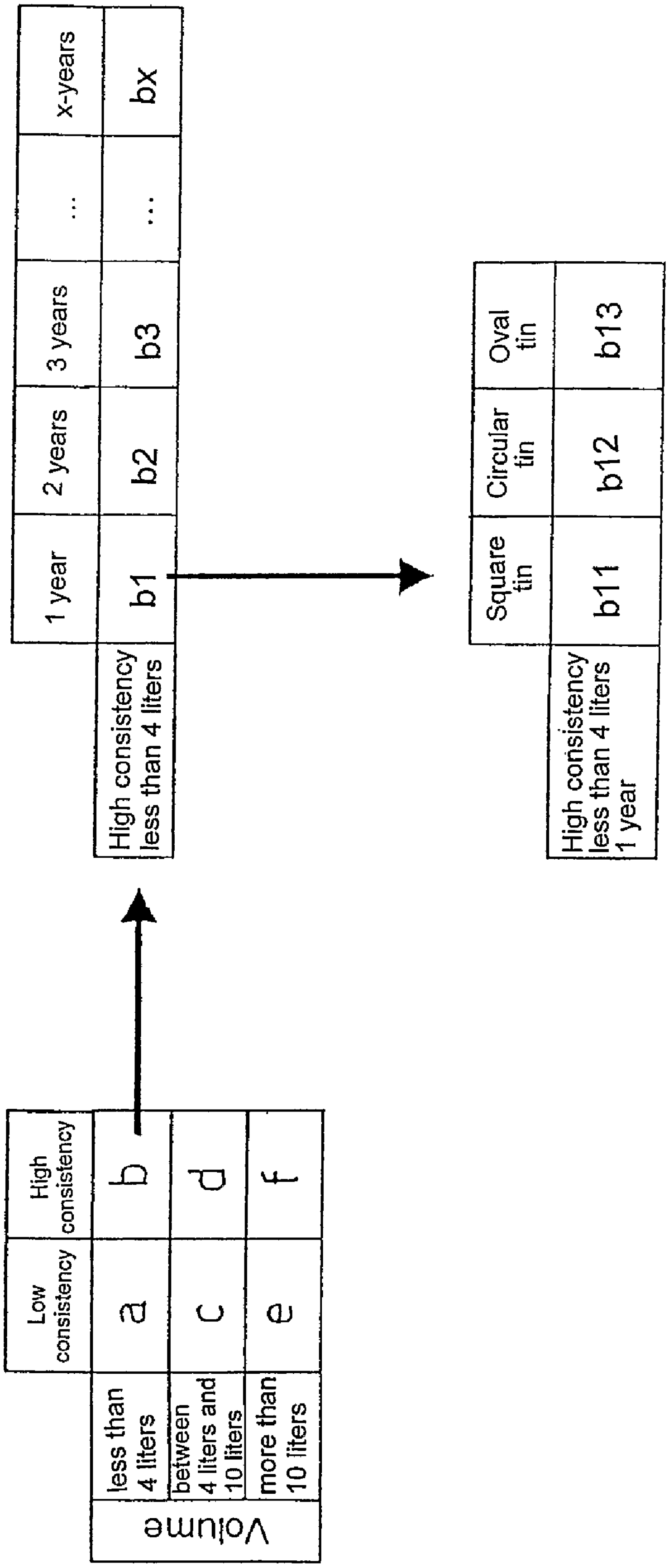
FIG. 6 shows a detail of the method in FIG. 5.

With reference to FIG. 6, the method 70 provides a subdivision of the products according to their volume and their consistency, or density. For example, consider the case in which the products are subdivided according to three ranges of volume, to each of which a high or low consistency corresponds. In this way six first identification zones are achieved, having different values of volume/consistency, to which a respective letter from "a" to "f" corresponds. Based on these six first identification zones, the operating sequences (step 92) are defined to be sent to the processing unit 30 which, also according to the mixing device 11 or 111, achieves six corresponding optimum mixing cycles.

It is clear that, by increasing the number of ranges of volume and/or the number of corresponding ranges of consistency, the number of first identification zones also increases, and therefore the number of corresponding mixing cycles. Therefore the level of accuracy of the mixing according to the product also increases.

In order to further improve the accuracy of the mixing, the method provides to identify other characteristics of the product, such as for example its state of preservation. A series of second identification zones is associated with each of the first identification zones, in this way also considering the age of the product and further optimizing the mixing cycles. Apart from the previous identification zones the method provides to add another series of third identification zones which also identify the shape of the container 15.

According to a variant, in order to further increase the accuracy of the mixing, the above subdivision into product identification zones also comprises a subdivision into zones to identify the container 15, according to the characteristics of the container 15 in which the product to be mixed is contained.

The following table lists the most common mixing devices and the parameters that can be varied in order to improve the elementary mixing cycle.

| Type of mixing device | t | $\omega_1$ | $\omega_2$ | F | A | $\alpha$ |
|---|---|---|---|---|---|---|
| gyroscopic | yes | yes | yes | — | — | — |
| vibrational | yes | — | — | yes | yes | — |
| rotational-vibrational | yes | — | yes | yes | yes | — |
| orbital | yes | yes | — | — | — | yes |

In the table, t is the mixing time, $\omega_1$ is the angular velocity of the main rotation, $\omega_2$ is the angular velocity of the secondary rotation, F is the frequency of the oscillations, A is the amplitude of the oscillations, and $\alpha$ is an angle of inclination between the axes of rotation of the main rotation Y and the secondary rotation X. "Yes" indicates that this parameter is actually available on that mixing device.

It is clear that modifications and/or additions of parts may be made to the mixing machine 10 and relative method 70 as described heretofore, without departing from the field and scope of the present invention.

For example, the mixing machine 10, in a simplified version, can comprise a single mixing device 11, of the gyroscopic type, or 111, of the vibrational or rotational-vibrational type, or any other type.

It is also clear that, although the present invention has been described with reference to some specific examples, a person of skill in the art shall certainly be able to achieve many other equivalent forms of mixing machines for mixing a fluid product contained in a closed container, and relative mixing methods, having the characteristics as set forth in the claims and hence all coming within the field of protection defined thereby.

The invention claimed is:

1. A mixing machine for mixing a fluid painting product consisting of a base component and an added dye, contained in a removable, selected and closed container, comprising:

one or more mixing devices each configured to receive said removable, selected and closed container and to mix said fluid painting product according to a determinate mixing cycle, said determinate mixing cycle being a combination of two or more elementary mixing cycles chosen from a plurality of elementary mixing cycles, wherein each of said one or more mixing devices comprises:

a clamping mechanism configured to selectively clamp said removable, selected and closed container with a determinate clamping force by means of a command electric motor; and a main electric motor able to impart to said removable, selected and closed container the movements necessary to mix said base component with said added dye, so as to obtain a homogeneous fluid painting product;

manually operable data introduction means for manually introducing the characteristics of said removable, selected and closed container and of said fluid painting product, and;

a command and control unit having a processing unit connected to said manually operable data introduction means and able to control and selectively drive both said command electric motor and said main electric motor of said one or more mixing devices according to the data manually introduced by means of said data introduction means, wherein said command and control unit comprises a first memory connected to said processing unit and in which both the operating sequences of said plurality of elementary mixing cycles and also the definable characteristics of the different fluid painting products to be mixed, of the different types of removable, selected and closed containers and the different mixing devices to be controlled are memorized, wherein said manually operable data introduction means are connected to a second memory connected to said processing unit and in which the characteristics of said removable, selected and closed container and of said fluid painting product to be mixed are able to be memorized, and wherein each operating sequence of said determinate mixing cycle is automatically pre-defined and controlled by said processing unit according to said characteristics of said removable, selected and closed container and of said fluid painting product to be mixed memorized in said second memory by means of said manually operable data introduction means.

2. A mixing machine as in claim 1, wherein each at least one of said mixing devices also comprises repositioning means able to position said removable, selected and closed container in a determinate initial position at the end of said determinate mixing cycle, wherein said repositioning means comprises an electric actuator and an associated repositioning sensor connected to said processing unit.

3. A mixing machine as in claim 1, wherein said mixing device comprises detection means able to detect the position or the velocity of said main electric motor and of said command electric motor and to generate corresponding electric signals for said processing unit.

* * * * *